(12) United States Patent
Hiramaru et al.

(10) Patent No.: US 11,814,127 B2
(45) Date of Patent: Nov. 14, 2023

(54) SADDLE-RIDE VEHICLE

(71) Applicant: HONDA MOTOR CO., LTD., Tokyo (JP)

(72) Inventors: Masayuki Hiramaru, Tokyo (JP); Tomohiro Suzuki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1 day.

(21) Appl. No.: 17/697,387

(22) Filed: Mar. 17, 2022

(65) Prior Publication Data
US 2022/0315149 A1 Oct. 6, 2022

(30) Foreign Application Priority Data
Mar. 31, 2021 (JP) .................. 2021-061801

(51) Int. Cl.
*B62J 9/10* (2020.01)
*B62J 11/00* (2020.01)

(52) U.S. Cl.
CPC ................ *B62J 9/10* (2020.02); *B62J 11/00* (2013.01)

(58) Field of Classification Search
CPC ... B62J 9/10; B62J 11/00; B62J 50/21; B62K 11/04; B62K 25/283; B62L 3/04; B60T 11/26
See application file for complete search history.

(56) References Cited

U.S. PATENT DOCUMENTS

| 7,870,924 B2* | 1/2011 | Fujita | B62K 25/286 |
| | | | 280/285 |
| 9,352,799 B2* | 5/2016 | Tsubone | B62K 19/38 |
| 2006/0181143 A1 | 8/2006 | Yamamoto | |
| 2007/0295547 A1* | 12/2007 | Oodachi | B62J 23/00 |
| | | | 180/229 |
| 2009/0058030 A1 | 3/2009 | Fujita et al. | |
| 2010/0064838 A1 | 3/2010 | Siew et al. | |
| 2015/0329166 A1 | 11/2015 | Tsubone et al. | |
| 2017/0282885 A1* | 10/2017 | Koishikawa | B60T 17/06 |
| 2018/0265057 A1* | 9/2018 | Hasegawa | B60T 8/172 |
| 2019/0120421 A1* | 4/2019 | Ohnishi | F16M 13/02 |

FOREIGN PATENT DOCUMENTS

| CA | 2962253 A1 * | 9/2017 | ............. B60T 17/06 |
| JP | 2009-56895 A | 3/2009 | |
| JP | 2010-173337 A | 8/2010 | |
| JP | 2014-118031 A | 6/2014 | |

(Continued)

OTHER PUBLICATIONS

Japanese Office Action dated Jan. 17, 2023 issued in corresponding Japanese application No. 2021-061801; English machine translation included (11 pages).

(Continued)

*Primary Examiner* — Grant Moubry
*Assistant Examiner* — James G Moubry
(74) *Attorney, Agent, or Firm* — Rankin, Hill & Clark LLP

(57) ABSTRACT

The saddle-ride vehicle includes: a vehicle body frame; a hydraulic braking device that brakes a rear wheel; and a reservoir tank that stores a brake fluid of the braking device, the reservoir tank being supported on the vehicle body frame via a bracket, the reservoir tank being covered from an outside in a vehicle width direction by the vehicle body frame.

11 Claims, 9 Drawing Sheets

(56) References Cited

FOREIGN PATENT DOCUMENTS

| JP | 2015-000616 | | 1/2015 | | |
|---|---|---|---|---|---|
| JP | 6076842 | B2 | 2/2017 | | |
| TW | 201012701 | A | 4/2010 | | |
| WO | WO-2020031456 | A1 * | 2/2020 | ............. | B62K 19/38 |

OTHER PUBLICATIONS

Indian Office Action dated Jan. 9, 2023 issued in corresponding Indian application No. 202244016625; English translation included (5 pages).

* cited by examiner

SADDLE-RIDE VEHICLE

INCORPORATION BY REFERENCE

The present application claims priority under 35 U.S.C. § 119 to Japanese Patent Application No. 2021-061801 filed on Mar. 31, 2021. The content of the application is incorporated herein by reference in its entirety.

BACKGROUND OF THE INVENTION

Field of the Invention

The present invention relates to a saddle-ride vehicle.

Description of the Related Art

In the related art, there is known a saddle-ride vehicle in which a reservoir tank for storing brake fluid of a braking device of a rear wheel is supported on a vehicle body frame via a bracket (for example, see Japanese Patent Laid-Open No. 2015-000616). In Japanese Patent Laid-Open No. 2015-000616, the bracket is a footrest stay for supporting a footrest for a passenger. In Japanese Patent Laid-Open No. 2015-000616, since a part of the reservoir tank is covered from the outside in a vehicle width direction by the footrest stay, the reservoir tank becomes inconspicuous.

However, according to Japanese Patent Laid-Open No. 2015-000616, since the reservoir tank is covered by a relatively thin footrest stay, the reservoir tank is exposed to the outside in the vehicle width direction. Further, when the reservoir tank is exposed, the rider's foot may contact with the reservoir tank.

The present invention has been made in view of such a circumstance, and an object of the present invention is to provide a saddle-ride vehicle that has an improved appearance with an inconspicuous reservoir tank while contact of rider's foot with the reservoir tank is prevented.

SUMMARY OF THE INVENTION

A saddle-ride vehicle according to an aspect of the present invention includes: a vehicle body frame; a hydraulic braking device configured to brake a rear wheel; and a reservoir tank configured to store a brake fluid of the braking device, the reservoir tank being supported on the vehicle body frame via a bracket, the reservoir tank being covered from an outside in a vehicle width direction by the vehicle body frame.

According to the aspect of the present invention, the saddle-ride vehicle is provided that has an improved appearance with an inconspicuous reservoir tank while contact of rider's foot with the reservoir tank is prevented.

DETAILED DESCRIPTION OF THE PREFERRED EMBODIMENT

Figure 1:
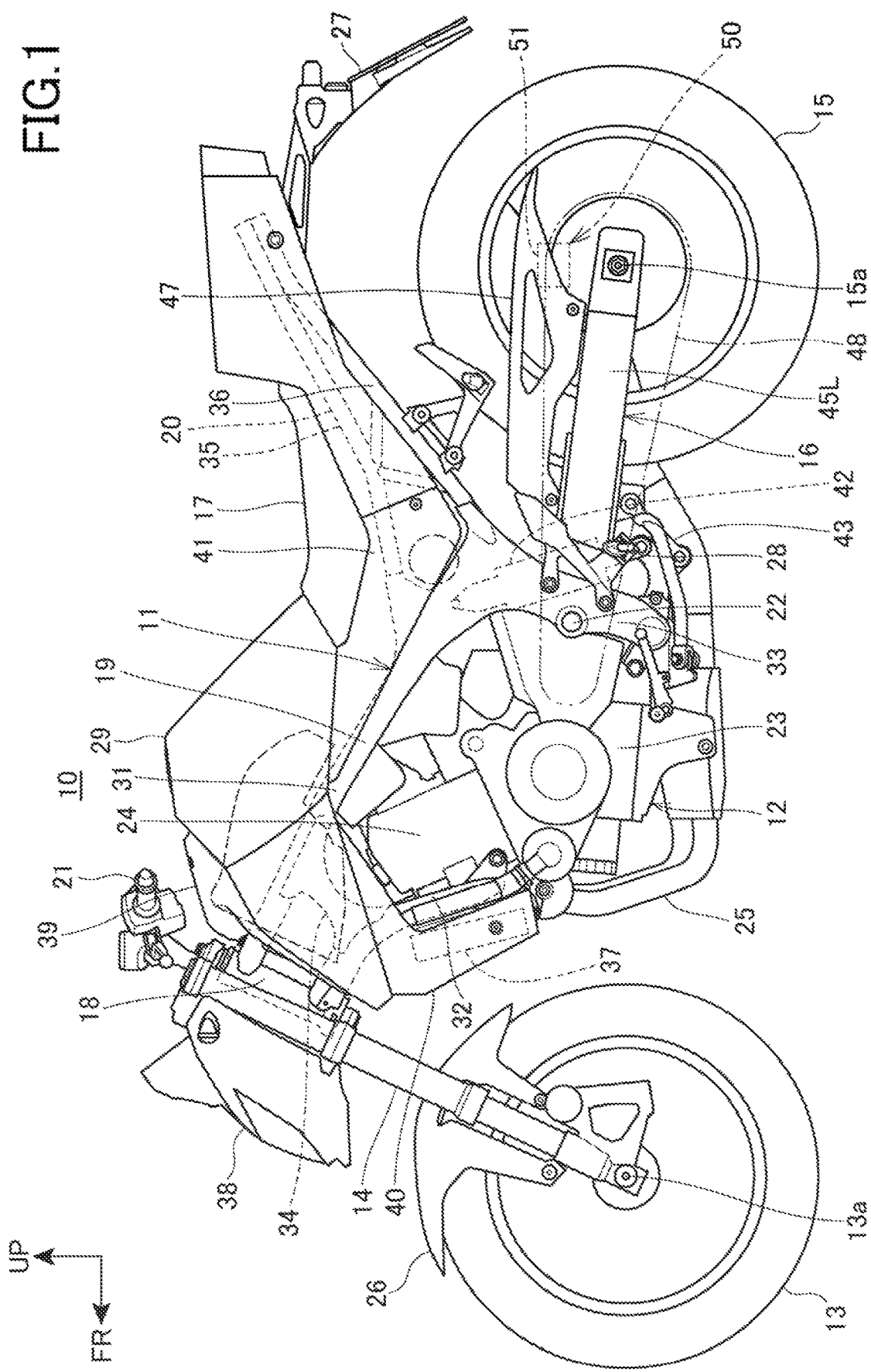
FIG. 1 is a side view of a saddle-ride vehicle according to an embodiment of the present invention.

An embodiment of the present invention will be described below with reference to the drawings. Unless otherwise mentioned, directions including front-rear, left-right, and up-down mentioned in the description are the same as those directions relative to a vehicle body. Reference signs FR, UP, and LH shown in the drawings indicate a vehicle body front side, a vehicle body upper side, and a vehicle body left side, respectively.

Embodiment

FIG. 1 is a side view of a saddle-ride vehicle 10 according to an embodiment of the present invention.

The saddle-ride vehicle 10 is a vehicle including a vehicle body frame 11, a power unit 12 supported on the vehicle body frame 11, a front fork 14 that supports a front wheel 13 in a steerable manner, a swing arm 16 that supports a rear wheel 15, and a seat 17 for a rider.

The saddle-ride vehicle 10 is a vehicle on which the rider sits astride the seat 17. The seat 17 is provided above a rear part of the vehicle body frame 11.

The vehicle body frame 11 includes a head pipe 18 provided at a front end portion of the vehicle body frame 11, a front frame 19 located on a rear side of the head pipe 18, and a rear frame 20 located on a rear side of the front frame 19. A front end portion of the front frame 19 is connected to the head pipe 18.

The seat 17 is supported on the rear frame 20.

The front fork 14 is supported on the head pipe 18 in such a manner that it can be steered left and right. The front wheel 13 is supported on an axle 13a provided at a lower end portion of the front fork 14. A handle 21 for steering that the rider grasps is mounted at an upper end portion of the front fork 14.

The swing arm 16 is supported on a pivot shaft 22 that is supported on the vehicle body frame 11. The pivot shaft 22 is a shaft extending horizontally in a vehicle width direction. The pivot shaft 22 is passed through a front end portion of the swing arm 16. The swing arm 16 swings up and down around the pivot shaft 22.

The rear wheel 15 is supported on an axle 15a provided at a rear end portion of the swing arm 16.

The power unit 12 is disposed between the front wheel 13 and the rear wheel 15 and supported on the vehicle body frame 11.

The power unit 12 is an internal combustion engine. The power unit 12 includes a crankcase 23 and a cylinder 24 that houses a reciprocating piston. An exhaust device 25 is connected to an exhaust port of the cylinder 24.

An output of the power unit 12 is transmitted to the rear wheel 15 through a drive power transmission member that connects the power unit 12 and the rear wheel 15 to each other.

The saddle-ride vehicle 10 further includes a front fender 26 that covers the front wheel 13 from above, a rear fender 27 that covers the rear wheel 15 from above, footrests 28 on which the rider places his or her feet, and a fuel tank 29 that stores fuel to be used by the power unit 12.

The front fender 26 is mounted on the front fork 14. The rear fender 27 and the footrests 28 are provided on a lower side relative to the seat 17. The fuel tank 29 is supported on the vehicle body frame 11.

The saddle-ride vehicle 10 is a motorcycle, and the front wheel 13 and the rear wheel 15 are located at the center in the vehicle width direction.

The front frame 19 includes a pair of left and right main frames 31 extending rearward and downward from an upper part of the head pipe 18, a pair of left and right down frames 32 extending rearward and downward from a lower part of the head pipe 18, a pair of left and right pivot frames 33 extending downward from rear end portions of the main frames 31, and a gusset 34 configured to connect the down frames 32 to each other behind the head pipe 18.

The rear frame 20 includes a pair of left and right seat frames 35 extending rearward and upward from the rear end portions of the main frames 31 and a pair of left and right subframes 36 extending rearward and upward from upper end portions of the pivot frames 33 and connected to rear end portions of the seat frames 35.

The power unit 12 is disposed between the down frame 32 and the pivot frame 33 below the main frame 31.

The cylinder 24 extends upward from an upper surface of a front part of the crankcase 23.

The fuel tank 29 is disposed between the seat 17 and the head pipe 18 in a vehicle front-rear direction above the main frame 31. The fuel tank 29 is supported on the main frame 31.

A radiator 37, through which cooling water of the power unit 12 passes, is disposed in front of the cylinder 24 and the down frame 32, and is mounted on the down frame 32.

The saddle-ride vehicle 10 includes, as vehicle body covers, a front cover 38 that covers the head pipe 18 from the front side, a tank cover 39 that covers the fuel tank 29 from the front side, a pair of left and right radiator shrouds 40 that cover the radiator 37 from the outside in the vehicle width direction, and a pair of left and right side covers 41 that cover the vehicle body below the seat 17 from the outside in the vehicle width direction.

The saddle-ride vehicle 10 includes a rear suspension 42 that attenuates swing in an up-down direction of the swing arm 16. An upper end portion of the rear suspension 42 is connected to the rear part of the vehicle body frame 11, and a lower end portion of the rear suspension 42 is connected to the swing arm 16 via a link mechanism 43.

The rear suspension 42 is disposed between the left and right pivot frames 33.

Figure 2:
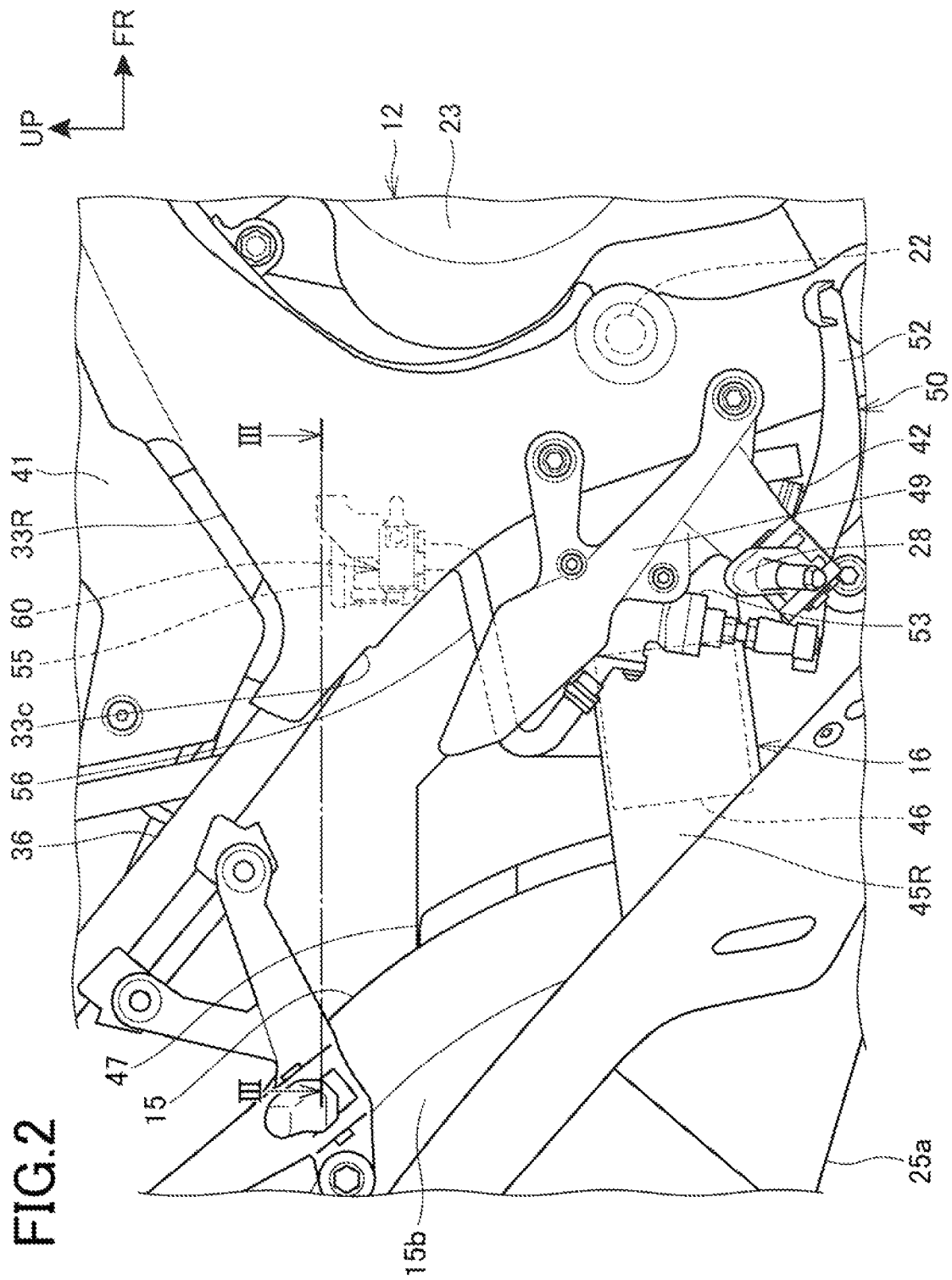
FIG. 2 is a right side view of a rear part of the saddle-ride vehicle.

FIG. 2 is a right side view of the rear part of the saddle-ride vehicle 10.

With reference to FIGS. 1 and 2, the swing arm 16 includes a pair of left and right arms 45L and 45R extending in the vehicle front-rear direction and a cross member 46 configured to connect the left and right arms 45L and 45R to each other in the vehicle width direction.

The pivot shaft 22 is connected to front end portions of the arms 45L and 45R. Each of the front end portions of the arms 45L and 45R is disposed between the left and right pivot frame 33.

The cross member 46 is located behind the pivot shaft 22 and in front of the rear wheel 15. The rear wheel 15 is disposed behind the cross member 46 and between the left and right arms 45L and 45R.

A muffler 25a of the exhaust device 25 is disposed on an outer side of a rear part of the one arm 45R (right arm) of the left and right arms.

A cover member 47 is mounted on the other arm 45L (left arm) of the left and right arms to cover the drive power transmission member from the side and above. The drive power transmission member is a chain 48.

With reference to FIG. 2, a footrest holder 49 is mounted on the right pivot frame 33 to support the right footrest 28. The footrest holder 49 extends rearward from the pivot frame 33. The footrest holder 49 covers a front part of the arm 45R from the outside in the vehicle width direction. In the following description, the right pivot frame will be referred to as a pivot frame 33R.

The saddle-ride vehicle 10 includes a hydraulic braking device 50 configured to brake the rear wheel 15.

The braking device 50 includes a brake disc (not shown) provided on the rear wheel 15, a brake caliper 51 (FIG. 1) that clamps the brake disc to brake the rear wheel 15, a brake pedal 52 to be operated by the rider, a master cylinder 53 that generates hydraulic pressure depending on the operation of the brake pedal 52, and a brake pipe (not shown) that is configured to connect the master cylinder 53 and the brake caliper 51. The braking device 50 actuates the brake caliper 51 with hydraulic pressure of brake fluid generated in conjunction with the operation of the brake pedal 52, and brakes the rear wheel 15.

In addition, the saddle-ride vehicle 10 includes a reservoir tank 55 configured to store the brake fluid for the master cylinder 53 and a hose 56 configured to connect the reservoir tank 55 and the master cylinder 53.

The reservoir tank 55 is disposed above the master cylinder 53. The hose 56 is connected to the master cylinder 53 by extending downward from a lower part of the reservoir tank 55.

The reservoir tank 55 is supported on the pivot frame 33R via a bracket 60 mounted on the pivot frame 33R. The reservoir tank 55 and the bracket 60 are disposed on an inner side in the vehicle width direction relative to the pivot frame 33R.

Figure 3:
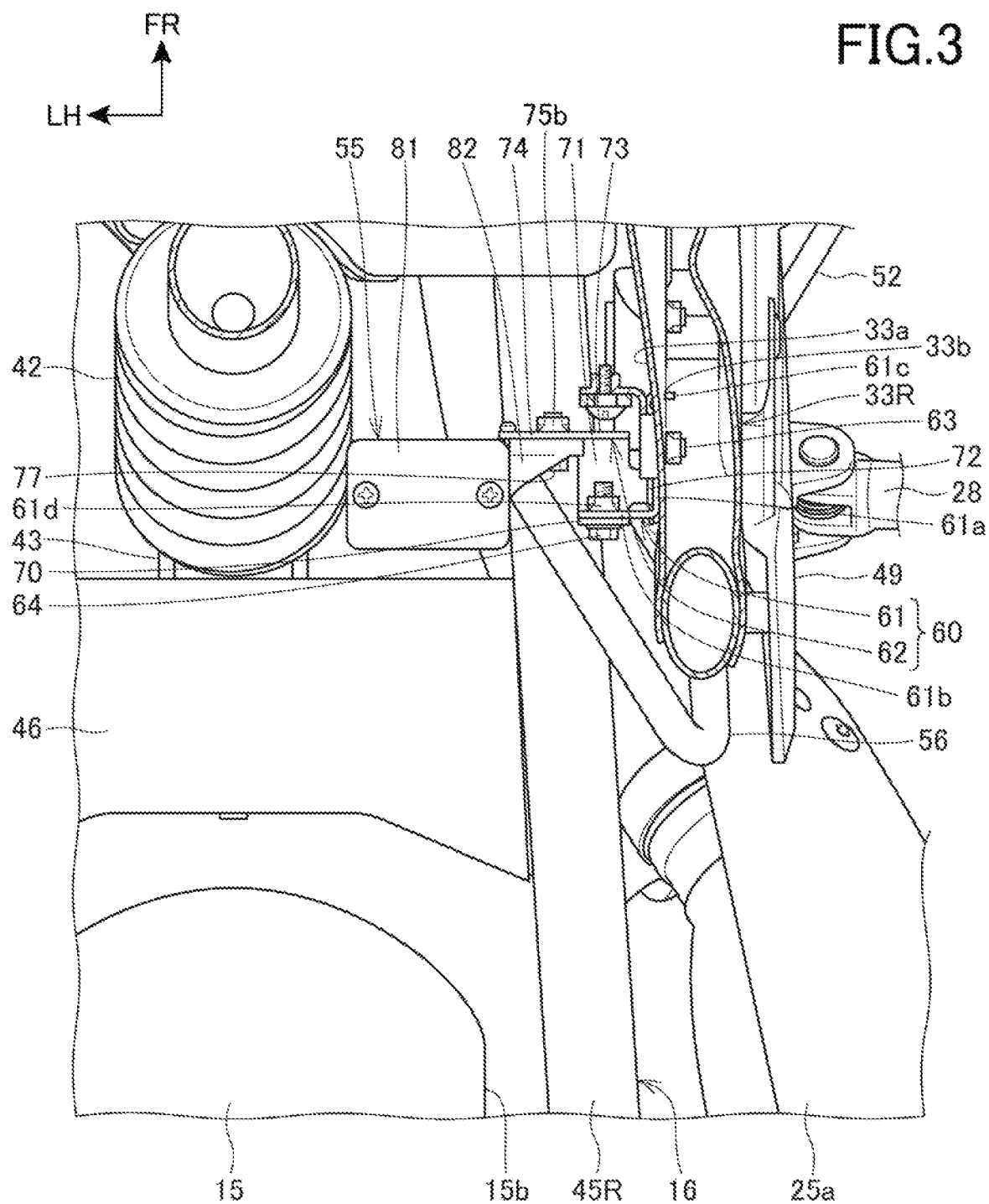
FIG. 3 is a cross-sectional view taken along line III-III in FIG. 2.
Figure 4:
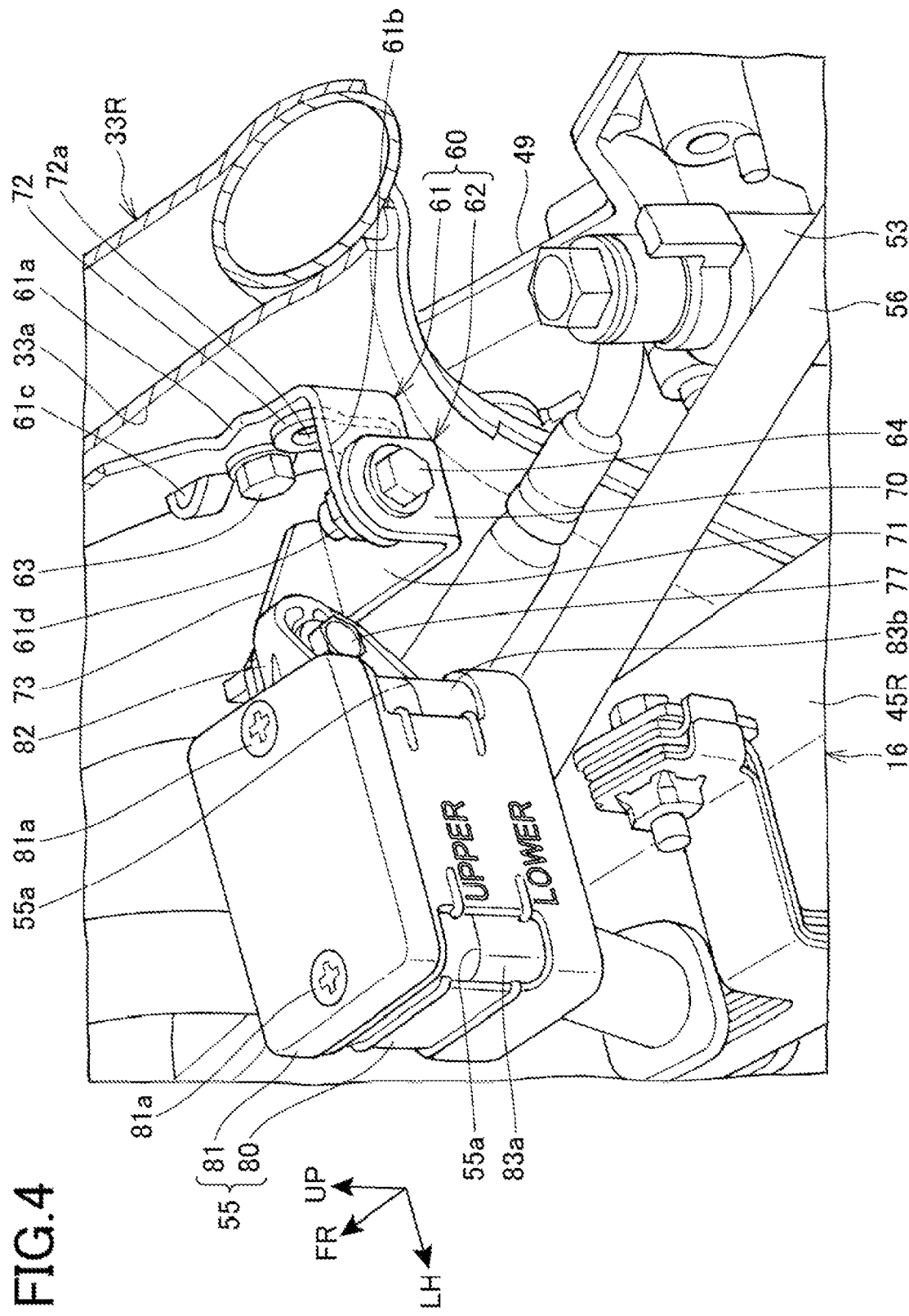
FIG. 4 is a perspective view of a mounting state of a reservoir tank as viewed from a rear side.

FIG. 3 is a cross-sectional view taken along line III-III in FIG. 2. FIG. 4 is a perspective view of a mounting state of the reservoir tank 55 as viewed from the rear side.

The bracket 60 is mounted on an inside surface 33a in the vehicle width direction of the pivot frame 33R.

Since the pivot frame 33R receives a load from the swing arm 16 via the pivot shaft 22, the pivot frame 33R is formed to have a relatively large size so as to receive the load. In a vehicle side view of FIG. 1, the pivot frame 33R has a width larger than those of the main frame 31, the down frame 32, the seat frame 35, and the subframe 36. Here, the width of each of the frames is a width in a direction orthogonal to a longitudinal direction of each of the frames in the vehicle side view.

The bracket 60 is mounted in either a state of a normal fixing position shown in FIGS. 2 to 4 or a state of a fixing position for maintenance shown in FIGS. 8 and 9 to be described below. In the following description, directions of the bracket 60 and the reservoir tank 55 will be described with reference to the state of the normal fixing position.

The bracket 60 includes a first bracket 61 fixed to the inside surface 33a of the pivot frame 33R in the vehicle width direction and a second bracket 62 to which the reservoir tank 55 is fixed.

The second bracket 62 is fixed to the first bracket 61.

The first bracket 61 includes a mounting portion 61a fixed to the inside surface 33a and a second bracket fixing portion 61b extending inward in the vehicle width direction from the mounting portion 61a.

The mounting portion 61a is a plate-shaped portion along the inside surface 33a. The mounting portion 61a includes a protrusion 61c that engages with a positioning hole 33b provided on the inside surface 33a.

The first bracket 61 is fastened to the inside surface 33a by a bracket fixture 63 passed through the mounting portion 61a from the inside in the vehicle width direction. Further, the first bracket 61 is stopped from rotating when the protrusion 61c is engaged with the positioning hole 33b.

The second bracket fixing portion 61b is a plate-shaped portion extending inward in the vehicle width direction from a rear end of the mounting portion 61a. The second bracket fixing portion 61b is disposed with a plate thickness direction which is directed toward the vehicle front-rear direction.

The second bracket fixing portion 61b includes a hole (not shown) that penetrates second bracket fixing portion 61b in the front-rear direction and a nut 61d that is provided coaxially with the hole. The nut 61d is welded to a front surface of the second bracket fixing portion 61b.

The nut 61d is fastened with a fastener 64, which is configured to fasten the second bracket 62 to the first bracket 61, from the rear side. The fastener 64 is a bolt, for example.

Figure 5:
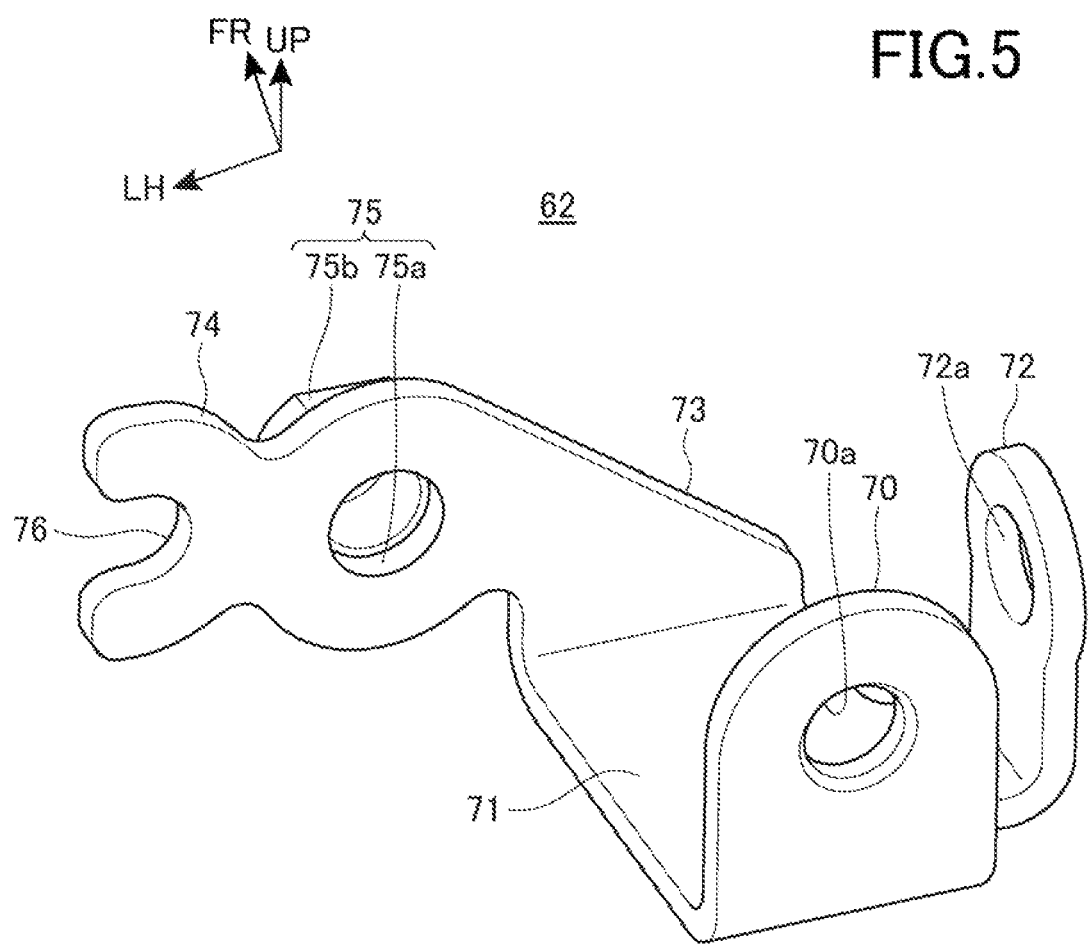
FIG. 5 is a perspective view of a second bracket as viewed from the rear side.
Figure 6:
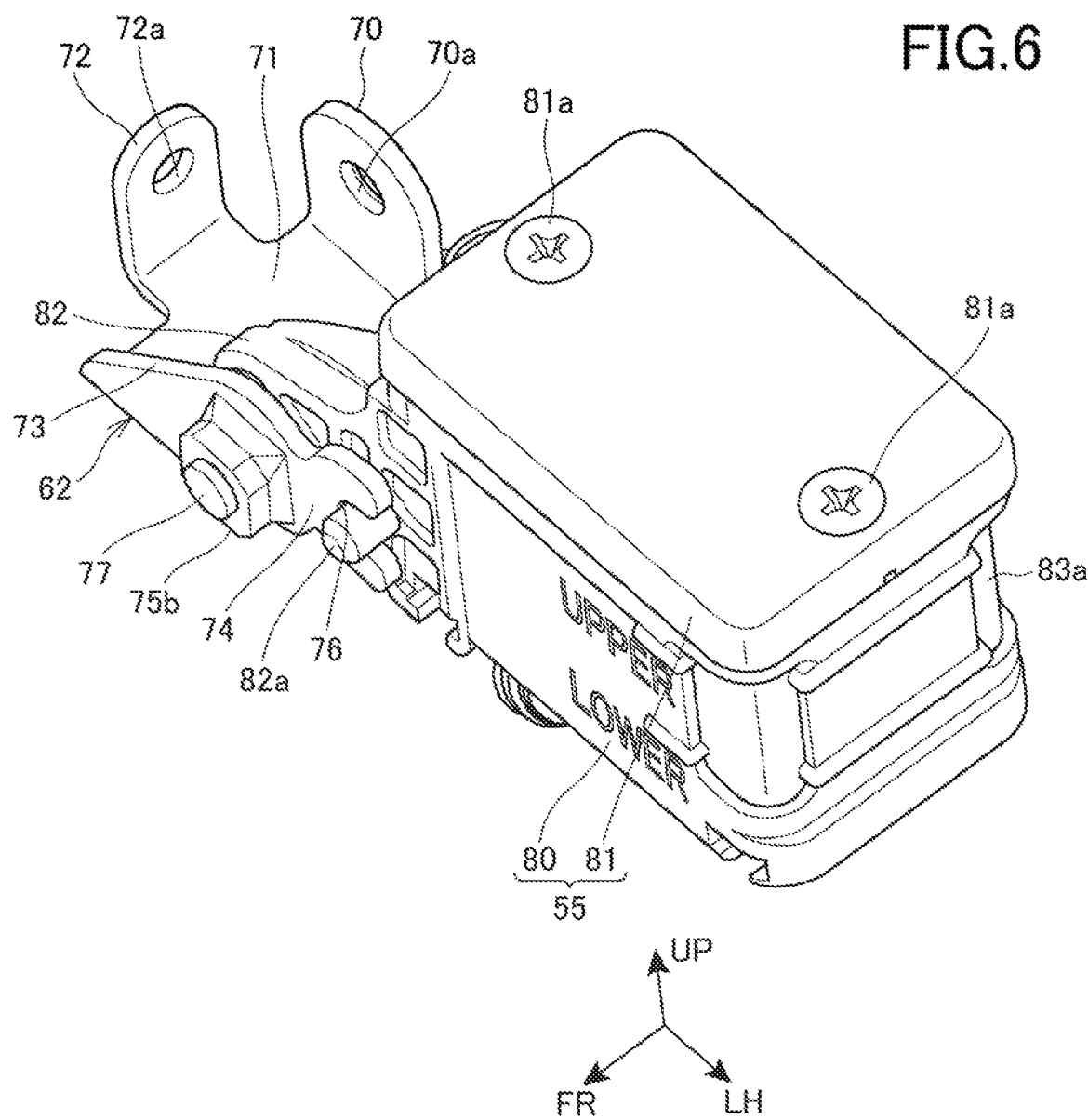
FIG. 6 is a perspective view of the reservoir tank mounted on the second bracket as viewed from a front side.

FIG. 5 is a perspective view of the second bracket 62 as viewed from the rear side. FIG. 6 is a perspective view of the reservoir tank 55 mounted on the second bracket 62 as viewed from the front side.

With reference to FIGS. 3 to 6, the second bracket 62 includes a first fixing portion 70 that is fixed to the second bracket fixing portion 61b of the first bracket 61 to set the reservoir tank 55 at the normal fixing position.

The first fixing portion 70 is a vertical wall portion that abuts on and fixed to the second bracket fixing portion 61b in the front-rear direction. The first fixing portion 70 is a plate-shaped portion disposed such that a plate thickness direction is directed to the vehicle front-rear direction. The first fixing portion 70 abuts on a rear surface of the second bracket fixing portion 61b from the rear side.

The first fixing portion 70 includes a hole 70a through which the fastener 64 is passed.

In addition, the second bracket 62 includes a plate-shaped extension portion 71 extending forward from a lower edge of the first fixing portion 70, a second fixing portion 72 extending upward from an outer edge of the extension portion 71 in the vehicle width direction, an upward extension portion 73 extending upward from a front edge of the extension portion 71, and a reservoir tank support portion 74 extending inward in the vehicle width direction from the upward extension portion 73.

The extension portion 71 is a substantially horizontal plate-shaped portion.

The second fixing portion 72 is a vertical wall portion disposed with a plate thickness direction which is directed toward the vehicle width direction.

In a plan view as viewed from above as shown in FIG. 3, the second fixing portion 72 is located in front of the first fixing portion 70 and outside in the vehicle width direction, and is disposed to be shifted by approximately 90° from the first fixing portion 70.

The second fixing portion 72 includes a hole 72a that penetrates the second fixing portion 72 in the plate thickness direction.

The upward extension portion 73 and the reservoir tank support portion 74 are plate-shaped portions formed with the same surface. The upward extension portion 73 and the reservoir tank support portion 74 are plate-shaped portions disposed with a plate thickness direction directed to the vehicle front-rear direction, and are substantially with the first fixing portion 70.

The reservoir tank support portion 74 includes a fastening portion 75 fastened with the reservoir tank 55 and an engaging portion 76 engaged with the reservoir tank 55.

The fastening portion 75 includes a hole 75a penetrating the reservoir tank support portion 74 in the plate thickness direction and a nut 75b disposed coaxially with the hole 75a. The nut 75b is welded to a front surface of the reservoir tank support portion 74. A reservoir tank fastener 77 is fastened to the fastening portion 75 from the rear side, the reservoir tank fastener 77 being configured to fasten the reservoir tank 55 to the reservoir tank support portion 74.

The engaging portion 76 is a notch portion in which a part of an inner edge of the reservoir tank support portion 74 in the vehicle width direction is notched toward the outside in the vehicle width direction.

With reference to FIGS. 3 to 6, the reservoir tank 55 includes a tank body 80 of a box shape having an open upper surface and a lid 81 that closes the open upper surface of the tank body 80.

The tank body 80 has a rectangular parallelepiped shape that is long in the vehicle width direction in a plan view. The lid 81 is fastened to the tank body 80 by a screw 81a. In a state where the lid 81 is removed, the brake fluid is replenished from the open upper surface of the tank body 80.

The reservoir tank 55 includes a stay portion 82 extending outward in the vehicle width direction from a lateral part on an outer side in the vehicle width direction of a front part of the tank body 80.

The stay portion 82 includes a hole (not shown) through which the reservoir tank fastener 77 is passed from the rear side and a protrusion 82a projecting forward from a front surface of the stay portion 82.

The reservoir tank 55 is fixed to the reservoir tank support portion 74 of the second bracket 62 via the stay portion 82.

The stay portion 82 is fastened to the rear surface of the reservoir tank support portion 74 by the reservoir tank fastener 77 that is passed through the stay portion 82 and the fastening portion 75 from the rear side.

Further, the reservoir tank 55 is stopped from rotating when the protrusion 82a is engaged with the engaging portion 76 of the reservoir tank support portion 74.

The reservoir tank 55 includes a pair of left and right check windows 83a and 83b on the rear surface of the tank body 80 such that a liquid level 55a of the brake fluid can be visually recognized from the outside. The check windows 83a and 83b are translucent windows.

The left check window 83a is provided at an inner corner in the vehicle width direction on the rear surface of the tank body 80. The right check window 83b is provided at an outer corner in the vehicle width direction on the rear surface of the tank body 80.

FIG. 2 to FIG. 4 show a state where the reservoir tank 55 is fixed at the normal fixing position.

The normal fixing position is a fixed position used at a normal time such as during driving of the saddle-ride vehicle 10 or during parking of the saddle-ride vehicle 10.

When the second bracket 62 is fixed to the second bracket fixing portion 61b of the first bracket 61 by the first fixing portion 70, the reservoir tank 55 is fixed at the normal fixing position.

In the state of the normal fixing position, the reservoir tank 55 and the bracket 60 are covered from the outside in the vehicle width direction by the pivot frame 33R. In other words, the pivot frame 33R overlaps the reservoir tank 55 and the bracket 60 from the outside in the vehicle width direction as viewed from the side of the vehicle.

Thus, the reservoir tank 55 and the bracket 60 are hidden by the pivot frame 33R as viewed from the side of the vehicle. This makes the reservoir tank 55 and the bracket 60 inconspicuous, and thus the saddle-ride vehicle 10 has an excellent appearance.

Specifically, the pivot frame 33R covers the entire reservoir tank 55 and the entire bracket 60 from the outside in the vehicle width direction. This makes the reservoir tank 55 and the bracket 60 inconspicuous, and thus the saddle-ride vehicle 10 has an excellent appearance.

In the state of the normal fixing position, the bracket 60 is located above the arm 45R, and overlaps the front part of the arm 45R from above in the plan view of FIG. 3.

In the state of the normal fixing position, the reservoir tank 55 is located between the arm 45R and the rear suspension 42 in the vehicle width direction. specifically, the tank body 80 and the lid 81 are disposed inside the arm 45R in the vehicle width direction. Therefore, the reservoir tank 55 can be moved toward the center in the vehicle width direction, and the mass of the saddle-ride vehicle 10 can be centralized.

The stay portion 82 of the reservoir tank 55 overlaps the arm 45R from above.

The pivot frame 33R is a portion of the vehicle body frame 11 to which the bracket 60 is fixed. The bracket 60 is disposed closer to the rear part of the pivot frame 33R as viewed from the side of the vehicle. Therefore, the bracket 60 and the reservoir tank 55 can be accessed from the rear side.

In the state of the normal fixing position, the second fixing portion 72 of the second bracket 62 abuts on the mounting portion 61a of the first bracket 61 from the inside in the vehicle width direction. Therefore, the second bracket 62 can be stopped from rotating by the second fixing portion 72. Due to the rotation stop, the second bracket 62 rotating around the fastener 64 is restricted from rotating. Thus, when the second bracket 62 is fixed by the fastener 64, the rotation of the second bracket 62 is restricted, and thus the second bracket 62 can be easily fixed.

In the state of the normal fixing position, the reservoir tank support portion 74 is located in front of the second bracket fixing portion 61b.

Figure 7:
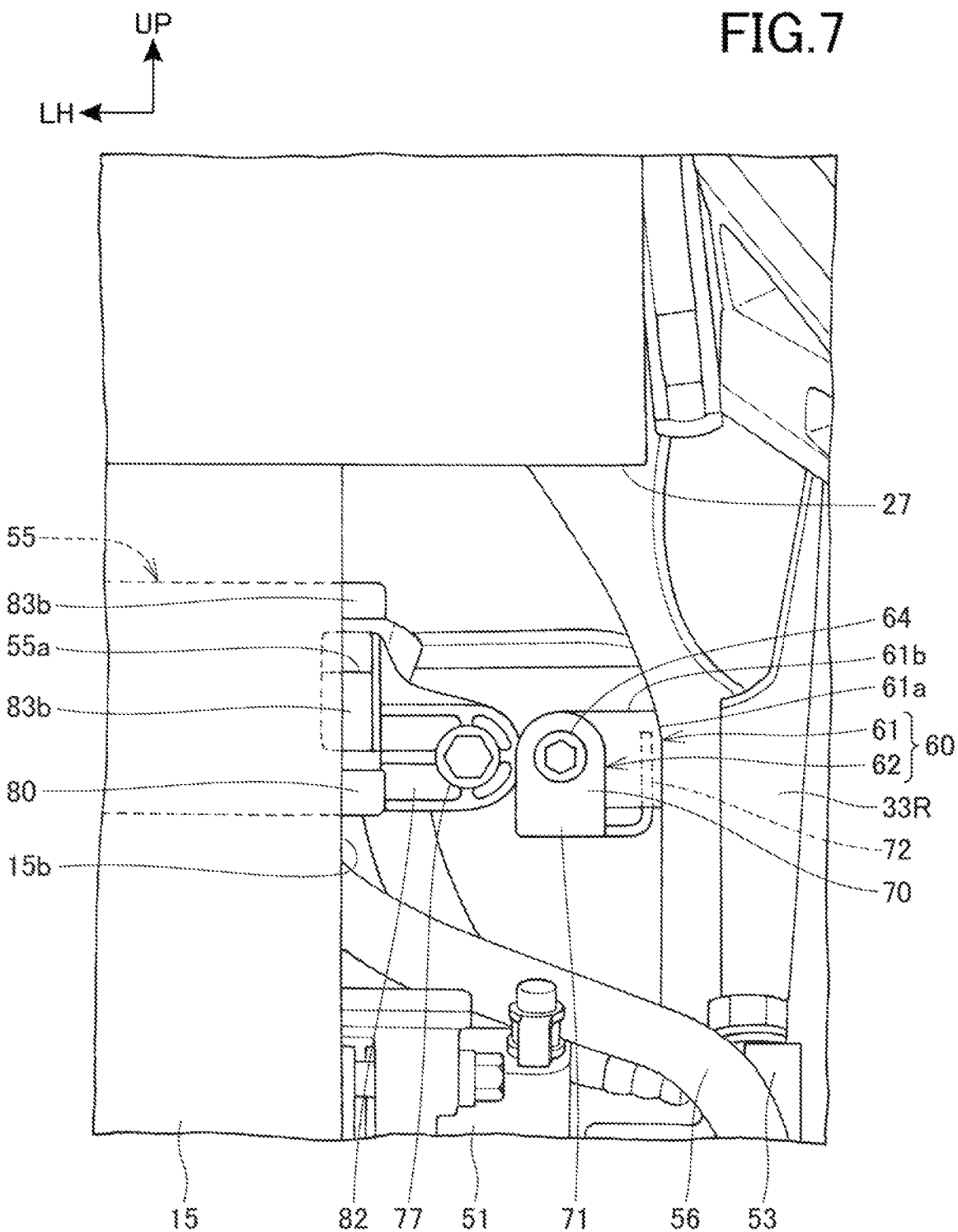
FIG. 7 is a view of the reservoir tank in a state of a normal fixing position as viewed from the rear side.

FIG. 7 is a view of the reservoir tank 55 in the state of the normal fixing position as viewed from the rear side.

As shown in FIG. 7, as viewed from the rear, the rear wheel 15 overlaps the tank body 80 and the lid 81 of the reservoir tank 55 from the rear side, and covers most of the tank body 80 and the lid 81 from the rear side.

This makes the reservoir tank 55 inconspicuous as viewed from the rear, and thus the saddle-ride vehicle 10 has an excellent appearance. Further, since the reservoir tank 55 is moved inward in the vehicle width direction until overlapping the rear wheel 15 in the vehicle width direction, the mass of the saddle-ride vehicle 10 can be centralized.

As viewed from the rear, the check window 83b of the reservoir tank 55 is located outside in the vehicle width direction relative to the outside surface 15b in the vehicle width direction of the rear wheel 15. Therefore, the liquid level 55a of the brake fluid can be checked through the check window 83b as viewed from the rear.

Figure 8:
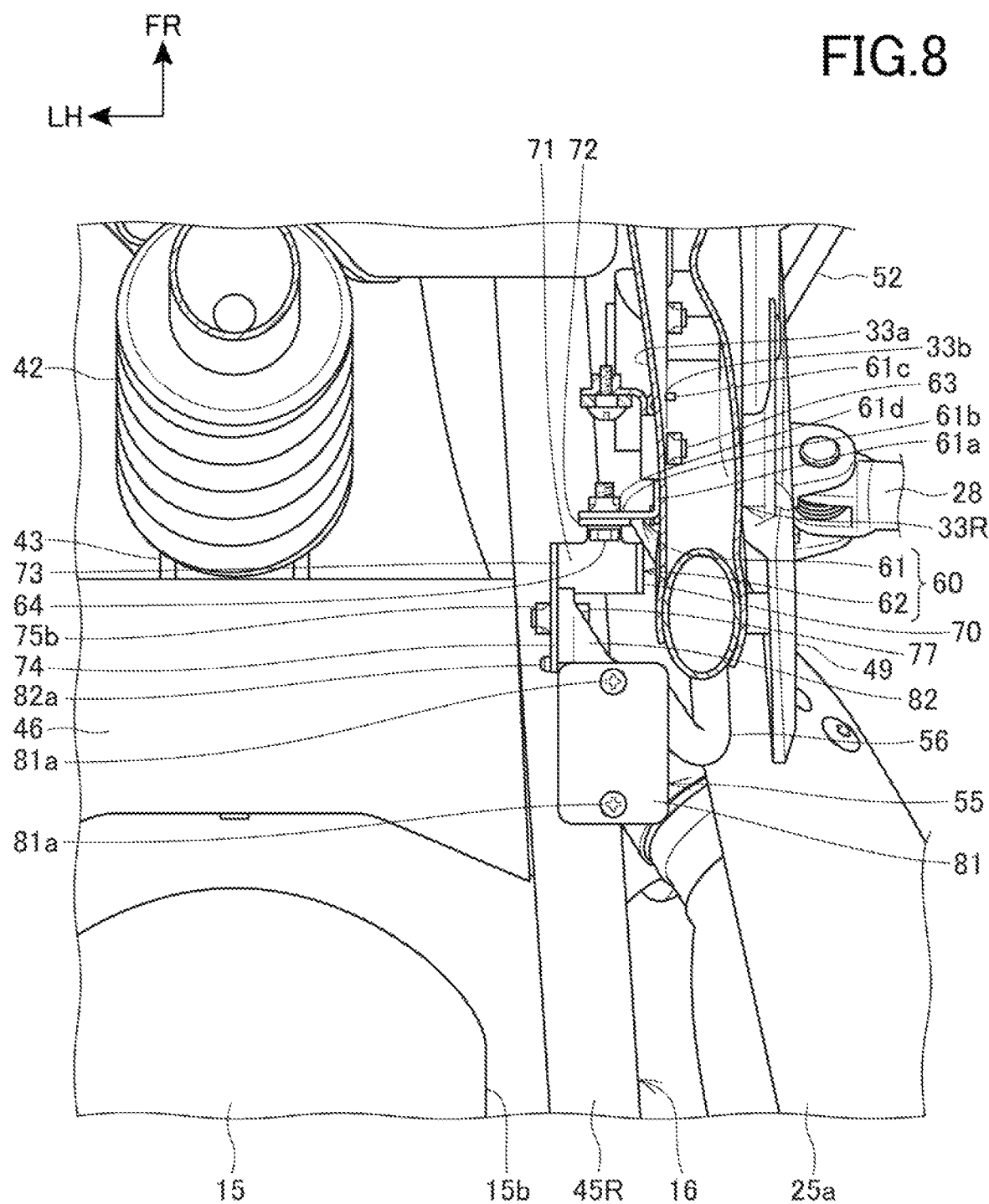
FIG. 8 is a cross-sectional view corresponding to the cross-sectional view taken along line III-III in FIG. 2 when the reservoir tank is fixed in a state of a fixing position for maintenance.
Figure 9:
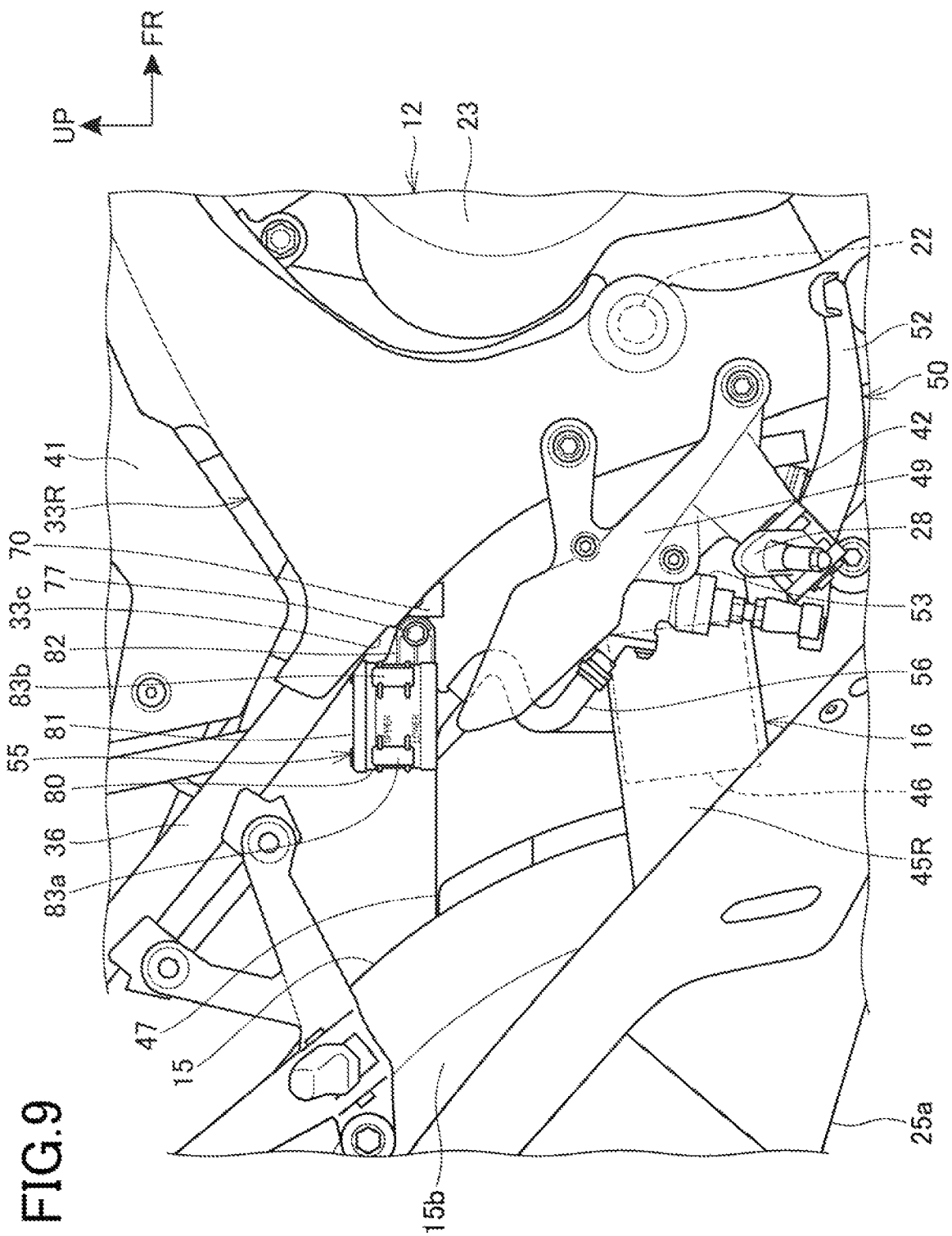
FIG. 9 is a right side view when the reservoir tank is fixed in the state of the fixing position for maintenance.

FIG. 8 is a cross-sectional view corresponding to the cross-sectional view taken along ling III-III in FIG. 2 when the reservoir tank 55 is fixed in the state of the fixing position for maintenance. FIG. 9 is a right side view when the reservoir tank 55 is fixed in the state of the fixing position for maintenance.

The fixing position for maintenance is a fixed position used at the time of maintenance of the saddle-ride vehicle 10.

When the second bracket 62 is fixed to the second bracket fixing portion 61b of the first bracket 61 by the second fixing portion 72, the reservoir tank 55 is fixed at the fixing position for maintenance.

In a case of a change from the normal fixing position to the fixing position for maintenance, a worker releases the fastening of the fastener 64 with reference to FIG. 3. Next, the worker rotates the second bracket 62 by approximately 90° counterclockwise in FIG. 3, and fastens the second fixing portion 72 to the second bracket fixing portion 61b with the same fastener 64 as shown in FIG. 8. Thus, the reservoir tank 55 is in the state of the fixing position for maintenance.

In the state of the fixing position for maintenance, the second fixing portion 72 is a vertical wall portion that abuts on and is fixed to the second bracket fixing portion 61b in the front-rear direction. In the state of the fixing position for maintenance, the second fixing portion 72 abuts on the rear surface of the second bracket fixing portion 61b from the rear side.

In the state of the fixing position for maintenance, the reservoir tank 55 is located behind the normal fixing position and outside in the vehicle width direction, and is shifted by approximately 90° from the normal fixing position.

In the state of the fixing position for maintenance, the reservoir tank 55 is located above the arm 45R to be on a rear side relative to a rear edge 33c of the pivot frame 33R. In the state of the fixing position for maintenance, the reservoir tank 55 is located below the subframe 36 and above the footrest holder 49 in front of the rear wheel 15.

In other words, in the state of the fixing position for maintenance, the reservoir tank 55 is not covered from the outside in the vehicle width direction by the pivot frame 33R, and is exposed to the outside in the vehicle width direction. In the state of the fixing position for maintenance, the entire reservoir tank 55 is substantially exposed to the outside in the vehicle width direction.

Specifically, in state of the fixing position for maintenance, the tank body 80, the lid 81, the stay portion 82, and the reservoir tank fastener 77 are exposed to the outside in the vehicle width direction behind the pivot frame 33R.

Therefore, the reservoir tank 55 can be easily accessed from the outside, and the reservoir tank 55 has excellent maintainability. For example, the lid 81 can be removed to replenish the tank body 80 with brake fluid.

In the state of the fixing position for maintenance, the first bracket 61 is covered from the outside in the vehicle width direction by the pivot frame 33R.

In the state of the fixing position for maintenance, the first fixing portion 70 of the second bracket 62 is located on the rear side of the pivot frame 33R, and is exposed to the outside in the vehicle width direction.

In the state of the fixing position for maintenance, the reservoir tank 55 overlaps the front part of the arm 45R from above.

In the state of the fixing position for maintenance, the check windows 83*a* and 83*b* are located on an outside surface in the vehicle width direction. Therefore, the liquid level 55*a* can be easily checked from the outside in the vehicle width direction through the check windows 83*a* and 83*b*.

The hose 56 has a length corresponding to the change from the normal fixing position to the fixing position for maintenance. Therefore, it is not necessary to change the connection state of the hose 56 at the time of the change from the normal fixing position to the fixing position for maintenance.

As described above, according to the embodiment of the present invention, the saddle-ride vehicle 10 includes the vehicle body frame 11, the hydraulic braking device 50 configured to brake the rear wheel 15, and the reservoir tank 55 configured to store the brake fluid of the braking device 50, the reservoir tank 55 is supported on the vehicle body frame 11 via the bracket 60, and the reservoir tank 55 is covered from the outside in a vehicle width direction by the vehicle body frame 11.

With such a configuration, the reservoir tank 55 is covered and hidden from the outside in the vehicle width direction by the vehicle body frame 11. This makes the reservoir tank 55 inconspicuous, and thus the appearance of the saddle-ride vehicle 10 is improved. In addition, since the reservoir tank 55 is inconspicuous, the reservoir tank 55 is hard to be tampered with something, the foot of the rider can be prevented from contacting with the reservoir tank 55.

Further, the vehicle body frame 11 includes the main frame 31 extending rearward from the head pipe 18 and the pivot frame 33R extending downward from the main frame 31, the pivot frame 33R supports the swing arm 16, which supports the rear wheel 15 in a swingable manner, via the pivot shaft 22, and the reservoir tank 55 is located above the swing arm 16 and is covered from the outside in the vehicle width direction by the pivot frame 33R.

With such a configuration, the pivot frame 33R is formed in a relatively large size so as to be able to receive a load from the swing arm 16. Since the reservoir tank 55 is covered from the outside in the vehicle width direction by the pivot frame 33R of the large size, the reservoir tank 55 can be effectively hidden.

The reservoir tank 55 is entirely covered from the outside in the vehicle width direction by the pivot frame 33R as viewed from the side of the vehicle.

With such a configuration, the reservoir tank 55 can be entirely hidden from the outside in the vehicle width direction by the pivot frame 33R, resulting in an excellent appearance of the saddle-ride vehicle 10.

Further, the reservoir tank 55 includes the check window 83*b* through which the liquid level 55*a* of the brake fluid can be visually recognized from the outside, and the check window 83*b* may be provided at the outer corner in the vehicle width direction on the rear surface of the reservoir tank 55.

With such a configuration, even when the reservoir tank 55 is covered by the vehicle body frame 11 from the outside in the vehicle width direction, the check window 83*b* can be easily seen from the outside.

Further, the rear wheel 15 overlaps a part of the reservoir tank 55 from the rear side in the rear view, and the check window 83*b* is located outside in the vehicle width direction relative to the outside surface 15*b* of the rear wheel 15 in the rear view.

With such a configuration, the reservoir tank 55 can be moved closer to the rear wheel 15 in the vehicle width direction, and thus the mass can be centralized in the vehicle width direction. In addition, since the check window 83*b* is located outside in the vehicle width direction relative to the outside surface 15*b* of the rear wheel 15, the check window 83*b* can be easily checked.

Further, the bracket 60 is capable of fixing the reservoir tank 55 at one of the normal fixing position in which the reservoir tank 55 is covered from the outside in the vehicle width direction by the vehicle body frame 11 and the fixing position for maintenance in which the reservoir tank 55 is not covered from the outside in the vehicle width direction by the vehicle body frame 11 but is exposed to the outside in the vehicle width direction.

With such a configuration, the reservoir tank 55 can be hidden by the vehicle body frame 11 at the normal fixing position, thereby improving the appearance of the saddle-ride vehicle 10. Since the reservoir tank 55 is exposed to the outside in the vehicle width direction when the reservoir tank 55 is changed to the fixing position for maintenance, the reservoir tank 55 has excellent maintainability.

In addition, the bracket 60 includes the first bracket 61 fixed to the vehicle body frame 11 and the second bracket 62 to which the reservoir tank 55 is fixed, the first bracket 61 includes the second bracket fixing portion 61*b* to which the second bracket 62 is fixed, and the second bracket 62 includes the first fixing portion 70 that is fixed to the second bracket fixing portion 61*b* to set the reservoir tank 55 to the normal fixing position and the second fixing portion 72 that is fixed to the second bracket fixing portion 61*b* to set the reservoir tank 55 to the fixing position for maintenance.

With such a configuration, since the first fixing portion 70 and the second fixing portion 72 are attached to the second bracket fixing portion 61*b* of the first bracket 61 in a replaceable manner, the normal fixing position and the fixing position for maintenance can be easily changed.

Further, the second fixing portion 72 abuts on the first bracket 61 to position the second bracket 62 in the state where the reservoir tank 55 is fixed at the normal fixing position by the first fixing portion 70.

With such a configuration, the second bracket 62 can be positioned with a simple structure using the second fixing portion 72 at the normal fixing position.

In addition, the first fixing portion 70 is fastened to the second bracket fixing portion 61*b* by the fastener 64 at the normal fixing position, and the second fixing portion 72 is fastened to the second bracket fixing portion 61*b* by the same fastener 64 at the fixing position for maintenance.

With such a configuration, since the second fixing portion 72 can be fixed using the fastener 64, which is removed from the first fixing portion 70, at the fixing position for maintenance, the number of components can be reduced.

Further, the fastener 64 is passed through the second bracket fixing portion 61*b* from the rear side to be fastened to the second bracket fixing portion 61*b*, and the first bracket 61 is disposed closer to the rear part of the pivot frame 33R which is a portion of the vehicle body frame 11 to which the bracket 60 is fixed.

With such a configuration, the fastener 64 and the second bracket fixing portion 61*b* can be easily accessed from the rear side of the pivot frame 33R, and the normal fixing position and the fixing position for maintenance can be easily changed.

Further, the first fixing portion 70 and the second fixing portion 72 are vertical wall portions that abut on and are fixed to the second bracket fixing portion 61*b* in the front-rear direction, and the second fixing portion 72 is disposed to be shifted by approximately 90° from the first fixing portion 70 in the plan view.

With such a configuration, the first fixing portion 70 and the second fixing portion 72 are attached to the second bracket fixing portion 61b in a replaceable manner, and thus the position of the reservoir tank 55 can be excellently changing.

Further, the rear wheel 15 is supported by the swing arm 16 supported on the vehicle body frame 11 in a swingable manner, and at least a part of the reservoir tank 55 is located inside the swing arm 16 in the vehicle width direction at the normal fixing position, and is located behind the normal fixing position and outside in the vehicle width direction at the fixing position for maintenance.

With such a configuration, the reservoir tank 55 can be moved closer to the inside in the vehicle width direction to centralize the mass of the saddle-ride vehicle 10 at the normal fixing position. Further, since the reservoir tank 55 is located behind the normal fixing position and outside in the vehicle width direction at the fixing position for maintenance, the reservoir tank 55 can be easily accessed. Therefore, the reservoir tank 55 has excellent maintainability.

The above-described embodiment merely represents one aspect of the present invention, and the present invention is not limited to the above-described embodiment.

In the above-described embodiment, the case has been described in which the second fixing portion 72 abuts on the first bracket 61 to perform the positioning of the second bracket 62 in the state of the normal fixing position, but the present invention is not limited thereto. For example, the second fixing portion 72 may abut on the inside surface 33a of the pivot frame 33R of the vehicle body frame 11 to perform the positioning of the second bracket 62.

In the above-described embodiment, the motorcycle is described as an example of the saddle-ride vehicle 10, but the present invention is not limited thereto. The present invention is applicable to a three-wheeled saddle-ride vehicle including two front wheels or two rear wheels and saddle-ride vehicles including four or more wheels.

Configurations Supported by Embodiment Described Above

The above-described embodiment is a specific example of the following configurations.

(Configuration 1) A saddle-ride vehicle including a vehicle body frame, a hydraulic braking device configured to brake a rear wheel, and a reservoir tank configured to store a brake fluid of the braking device, the reservoir tank being supported on the vehicle body frame via a bracket, the reservoir tank being covered from an outside in a vehicle width direction by the vehicle body frame.

With such a configuration, the reservoir tank is covered and hidden from the outside in the vehicle width direction by the vehicle body frame. This makes the reservoir tank inconspicuous and thus the appearance of the saddle-ride vehicle is improved. In addition, since the reservoir tank is inconspicuous, the reservoir tank is hard to be tampered with something, the foot of the rider can be prevented from contacting with the reservoir tank.

(Configuration 2) The saddle-ride vehicle according to Configuration 1, wherein the vehicle body frame includes a main frame extending rearward from a head pipe and a pivot frame extending downward from the main frame, the pivot frame supports a swing arm via a pivot shaft, the swing arm supporting the rear wheel in a swingable manner, and the reservoir tank is located above the swing arm, the reservoir tank being covered from the outside in the vehicle width direction by the pivot frame.

With such a configuration, the pivot frame is formed in a relatively large size so as to be able to receive a load from the swing arm. Since the reservoir tank is covered from the outside in the vehicle width direction by the pivot frame of the large size, the reservoir tank can be effectively hidden.

(Configuration 3) The saddle-ride vehicle according to Configuration 2, wherein the reservoir tank is entirely covered from the outside in the vehicle width direction by the pivot frame in a vehicle side view.

With such a configuration, the reservoir tank can be entirely hidden from the outside in the vehicle width direction by the pivot frame, resulting in an excellent appearance of the saddle-ride vehicle.

(Configuration 4) The saddle-ride vehicle according to Configuration 2 or 3, wherein the reservoir tank includes a check window, the check window enabling visual recognition of a liquid level of the brake fluid from the outside, and the check window is provided at an outer corner in the vehicle width direction on a rear surface of the reservoir tank.

With such a configuration, even when the reservoir tank is covered by the vehicle body frame from the outside in the vehicle width direction, the check window can be easily seen from the outside.

(Configuration 5) The saddle-ride vehicle according to Configuration 4, wherein the rear wheel overlaps a part of the reservoir tank from a rear side in a rear view, and the check window is located outside in the vehicle width direction relative to an outside surface of the rear wheel in the rear view.

With such a configuration, the reservoir tank can be moved closer to the rear wheel in the vehicle width direction, and thus the mass can be centralized in the vehicle width direction. In addition, since the check window is located outside in the vehicle width direction relative to the outside surface of the rear wheel, the check window can be easily checked.

(Configuration 6) The saddle-ride vehicle according to any one of Configurations 1 to 5, wherein the bracket is capable of fixing the reservoir tank at one of a normal fixing position and a fixing position for maintenance, the reservoir tank being covered from the outside in the vehicle width direction by the vehicle body frame in the normal fixing position, the reservoir tank being not covered from the outside in the vehicle width direction by the vehicle body frame but is exposed to the outside in the vehicle width direction in the fixing position for maintenance.

With such a configuration, the reservoir tank can be hidden by the vehicle body frame at the normal fixing position, thereby improving the appearance of the saddle-ride vehicle. Since the reservoir tank is exposed to the outside in the vehicle width direction when the reservoir tank is changed to the fixing position for maintenance, the reservoir tank has excellent maintainability.

(Configuration 7) The saddle-ride vehicle according to Configuration 6, wherein the bracket includes a first bracket and a second bracket, the first bracket being fixed to the vehicle body frame, the reservoir tank being fixed to the second bracket fixing portion, the first bracket includes a second bracket fixing portion, the second bracket being fixed to the second bracket fixing portion, and the second bracket includes a first fixing portion and a second fixing portion, the first fixing portion being fixed to the second bracket fixing portion to set the reservoir tank to the normal fixing position, the second fixing portion being fixed to the second bracket fixing portion to set the reservoir tank to the fixing position for maintenance.

With such a configuration, since the first fixing portion and the second fixing portion are attached to the second bracket fixing portion of the first bracket in a replaceable manner, the normal fixing position and the fixing position for maintenance can be easily changed.

(Configuration 8) The saddle-ride vehicle according to Configuration 7, wherein the second fixing portion abuts on the first bracket or the vehicle body frame to position the second bracket in a state where the reservoir tank is fixed at the normal fixing position by the first fixing portion.

With such a configuration, the positioning of the second bracket can be performed with a simple structure using the second fixing portion at the normal fixing position.

(Configuration 9) The saddle-ride vehicle according to Configuration 7 or 8, wherein the first fixing portion is fastened to the second bracket fixing portion by a fastener at the normal fixing position, and the second fixing portion is fastened to the second bracket fixing portion by the same fastener at the fixing position for maintenance.

With such a configuration, since the second fixing portion can be fixed using the fastener, which is removed from the first fixing portion, at the fixing position for maintenance, the number of components can be reduced.

(Configuration 10) The saddle-ride vehicle according to Configuration 9, wherein the fastener is passed through the second bracket fixing portion from a rear side to be fastened to the second bracket fixing portion, and the first bracket is disposed closer to a rear part of a portion of the vehicle body frame, the bracket being fixed to the portion of the vehicle body frame.

With such a configuration, the fastener and the second bracket fixing portion can be easily accessed from the rear side of the pivot frame, and the normal fixing position and the fixing position for maintenance can be easily changed.

(Configuration 11) The saddle-ride vehicle according to any one of Configurations 7 to 10, wherein the first fixing portion and the second fixing portion are vertical wall portions, the vertical wall portions abutting on the second bracket fixing portion in a front-rear direction to be fixed to the second bracket fixing portion, and the second fixing portion is disposed to be shifted by approximately 90° from the first fixing portion in a plan view.

With such a configuration, the first fixing portion and the second fixing portion are attached to the second bracket fixing portion in a replaceable manner, and thus the position of the reservoir tank can be excellently changing.

(Configuration 12) The saddle-ride vehicle according to any one of Configurations 7 to 11, wherein the rear wheel is supported by the swing arm supported on the vehicle body frame in a swingable manner, and at least a part of the reservoir tank is located inside the swing arm in the vehicle width direction at the normal fixing position, and is located behind the normal fixing position and outside in the vehicle width direction at the fixing position for maintenance.

With such a configuration, the reservoir tank can be moved closer to the inside in the vehicle width direction to centralize the mass of the saddle-ride vehicle at the normal fixing position. Further, since the reservoir tank is located behind the normal fixing position and outside in the vehicle width direction at the fixing position for maintenance, the reservoir tank can be easily accessed. Therefore, the reservoir tank has excellent maintainability.

REFERENCE SIGNS LIST 10 saddle-ride vehicle
11 vehicle body frame
15 rear wheel
15b outside surface
16 swing arm
18 head pipe
22 pivot shaft
31 main frame
33R pivot frame
50 braking device
55 reservoir tank
55a liquid level
60 bracket
61 first bracket
61b second bracket fixing portion
62 second bracket
64 fastener
70 first fixing portion (vertical wall portion)
72 second fixing portion (vertical wall portion)
83b check window

What is claimed is:

1. A saddle-ride vehicle comprising:
a vehicle body frame;
a hydraulic braking device configured to brake a rear wheel; and
a reservoir tank configured to store a brake fluid of the braking device,
the reservoir tank being supported on the vehicle body frame via a bracket,
the reservoir tank being covered from an outside in a vehicle width direction by the vehicle body frame, wherein
the bracket is capable of fixing the reservoir tank at one of a normal fixing position and a fixing position for maintenance, the reservoir tank being covered from the outside in the vehicle width direction by the vehicle body frame in the normal fixing position, the reservoir tank being not covered from the outside in the vehicle width direction by the vehicle body frame but is exposed to the outside in the vehicle width direction in the fixing position for maintenance.

2. The saddle-ride vehicle according to claim 1, wherein the vehicle body frame includes a main frame extending rearward from a head pipe and a pivot frame extending downward from the main frame,
the pivot frame supports a swing arm via a pivot shaft, the swing arm supporting the rear wheel in a swingable manner, and
the reservoir tank is located above the swing arm, the reservoir tank being covered from the outside in the vehicle width direction by the pivot frame.

3. The saddle-ride vehicle according to claim 2, wherein the reservoir tank is entirely covered from the outside in the vehicle width direction by the pivot frame in a vehicle side view.

4. The saddle-ride vehicle according to claim 2, wherein the reservoir tank includes a check window, the check window enabling visual recognition of a liquid level of the brake fluid from the outside, and
the check window is provided at an outer corner in the vehicle width direction on a rear surface of the reservoir tank.

5. The saddle-ride vehicle according to claim 4, wherein the rear wheel overlaps a part of the reservoir tank from a rear side in a rear view, and
the check window is located outside in the vehicle width direction relative to an outside surface of the rear wheel in the rear view.

6. The saddle-ride vehicle according to claim 1, wherein
the bracket includes a first bracket and a second bracket,
the first bracket being fixed to the vehicle body frame, the reservoir tank being fixed to the second bracket,
the first bracket includes a second bracket fixing portion, the second bracket being fixed to the second bracket fixing portion, and
the second bracket includes a first fixing portion and a second fixing portion, the first fixing portion being fixed to the second bracket fixing portion to set the reservoir tank to the normal fixing position, the second fixing portion being fixed to the second bracket fixing portion to set the reservoir tank to the fixing position for maintenance.

7. The saddle-ride vehicle according to claim 6, wherein the second fixing portion abuts on the first bracket or the vehicle body frame to position the second bracket in a state where the reservoir tank is fixed at the normal fixing position by the first fixing portion.

8. The saddle-ride vehicle according to claim 6, wherein the first fixing portion is fastened to the second bracket fixing portion by a fastener at the normal fixing position, and
the second fixing portion is fastened to the second bracket fixing portion by the same fastener at the fixing position for maintenance.

9. The saddle-ride vehicle according to claim 8, wherein the fastener is passed through the second bracket fixing portion from a rear side to be fastened to the second bracket fixing portion, and
the first bracket is disposed closer to a rear part of a portion of the vehicle body frame, the bracket being fixed to the portion of the vehicle body frame.

10. The saddle-ride vehicle according to claim 6, wherein the first fixing portion and the second fixing portion are vertical wall portions, the vertical wall portions abutting on the second bracket fixing portion in a front-rear direction to be fixed to the second bracket fixing portion, and the second fixing portion is disposed to be shifted by approximately 90° from the first fixing portion in a plan view.

11. The saddle-ride vehicle according to claim 6, wherein the rear wheel is supported by the swing arm supported on the vehicle body frame in a swingable manner, and
at least a part of the reservoir tank is located inside the swing arm in the vehicle width direction at the normal fixing position, and is located behind the normal fixing position and outside in the vehicle width direction at the fixing position for maintenance.

* * * * *